United States Patent
Ahmed

(10) Patent No.: US 9,069,617 B2
(45) Date of Patent: Jun. 30, 2015

(54) SYSTEM AND METHOD FOR INTELLIGENT GUI NAVIGATION AND PROPERTY SHEETS IN A TRAFFIC DIRECTOR ENVIRONMENT

(75) Inventor: Irfan Ahmed, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 58 days.

(21) Appl. No.: 13/601,663

(22) Filed: Aug. 31, 2012

(65) Prior Publication Data

US 2013/0080901 A1 Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
| | |
|---|---|
| *G06F 3/14* | (2006.01) |
| *G06F 9/50* | (2006.01) |
| *G06F 9/44* | (2006.01) |

(Continued)

(52) U.S. Cl.
CPC ............ *G06F 9/505* (2013.01); *G06F 9/4443* (2013.01); *G06F 9/45512* (2013.01); *G06F 11/2041* (2013.01); *H04L 67/1008* (2013.01); *H04L 41/08* (2013.01); *H04L 63/0853* (2013.01)

(58) Field of Classification Search
CPC ..................................... G06F 3/14; G06F 3/17

USPC .......... 715/200–277, 700–867; 700/701–866; 709/201–229; 705/50–79; 345/30–111; 717/172

See application file for complete search history.

(56) References Cited

U.S. PATENT DOCUMENTS

| 6,560,717 B1 | 5/2003 | Scott et al. |
| 6,691,244 B1 | 2/2004 | Kampe et al. |

(Continued)

FOREIGN PATENT DOCUMENTS

| GB | 2 360 369 A | 9/2001 |
| WO | 02/07037 | 1/2002 |

OTHER PUBLICATIONS

International Searching Authority, International Search Report and Written Opinion for PCT International Application No. PCT/US2012/057373, Feb. 14, 2013, 13 pages.

(Continued)

*Primary Examiner* — Ruay Ho
(74) *Attorney, Agent, or Firm* — Tucker Ellis LLP

(57) ABSTRACT

A traffic director system and method having a software-based load balancer which can be used to deliver a fast, reliable, scalable, and secure platform for load-balancing traffic to back-end origin servers, such as web servers, application servers, or other resource servers. Traffic director instances of the traffic director are configured to receive and communicate requests, from clients to origin servers or pools of origin servers. The traffic director has an administration console which provides a graphic user interface (GUI) for use by an administrator in reviewing and configuring different configurable objects of the traffic director. The GUI includes a "never-get-lost" navigation model including navigation option sections and a navigation tree section. Each of the navigation options of the GUI of the traffic director system is associated with content for display within the navigation tree section of the GUI.

20 Claims, 11 Drawing Sheets

(51) Int. Cl.
*G06F 9/455* (2006.01)
*G06F 11/20* (2006.01)
*H04L 29/08* (2006.01)
*H04L 12/24* (2006.01)
*H04L 29/06* (2006.01)

(56) References Cited

U.S. PATENT DOCUMENTS

| | | | |
|---|---|---|---|
| 6,880,156 B1 | 4/2005 | Landherr et al. | |
| 7,158,926 B2 | 1/2007 | Kampe | |
| 7,289,445 B2 | 10/2007 | Illikkal et al. | |
| 7,321,926 B1 | 1/2008 | Zhang et al. | |
| 7,370,083 B2 | 5/2008 | Husain et al. | |
| 7,395,355 B2 | 7/2008 | Afergan et al. | |
| 7,616,625 B1 | 11/2009 | Un et al. | |
| 7,619,545 B2 | 11/2009 | Samuels et al. | |
| 7,664,948 B2 | 2/2010 | Moreau | |
| 7,849,368 B2 | 12/2010 | Srivastava | |
| 8,056,653 B2 | 11/2011 | Hunt et al. | |
| 8,260,757 B1 | 9/2012 | Chatterjee et al. | |
| 8,693,981 B1 | 4/2014 | Anugu | |
| 2001/0049732 A1 | 12/2001 | Raciborski et al. | |
| 2002/0087694 A1 | 7/2002 | Daoud | |
| 2002/0122388 A1 | 9/2002 | Behbehani | |
| 2002/0143953 A1 | 10/2002 | Aiken | |
| 2002/0143965 A1 | 10/2002 | Aiken | |
| 2002/0152307 A1 | 10/2002 | Doyle et al. | |
| 2003/0023743 A1 | 1/2003 | Raphel et al. | |
| 2003/0051055 A1 | 3/2003 | Parrella et al. | |
| 2003/0195940 A1 | 10/2003 | Basu et al. | |
| 2004/0024853 A1 | 2/2004 | Cates et al. | |
| 2004/0024861 A1 | 2/2004 | Coughlin | |
| 2004/0031030 A1* | 2/2004 | Kidder et al. | 717/172 |
| 2004/0049598 A1 | 3/2004 | Tucker et al. | |
| 2004/0107273 A1 | 6/2004 | Biran et al. | |
| 2004/0172470 A1 | 9/2004 | Shiina | |
| 2005/0086337 A1 | 4/2005 | Quittek | |
| 2005/0102400 A1 | 5/2005 | Nakahara et al. | |
| 2005/0188295 A1 | 8/2005 | Konkus et al. | |
| 2005/0198247 A1* | 9/2005 | Perry et al. | 709/223 |
| 2005/0262183 A1 | 11/2005 | Colrain et al. | |
| 2006/0062177 A1 | 3/2006 | Asthana et al. | |
| 2006/0085680 A1 | 4/2006 | Matsuno | |
| 2006/0190579 A1 | 8/2006 | Rachniowski et al. | |
| 2006/0294207 A1 | 12/2006 | Barsness et al. | |
| 2007/0005801 A1 | 1/2007 | Kumar et al. | |
| 2007/0130341 A1 | 6/2007 | Ma | |
| 2007/0169049 A1 | 7/2007 | Gingell et al. | |
| 2007/0174660 A1 | 7/2007 | Peddada | |
| 2007/0226359 A1 | 9/2007 | Gunduc et al. | |
| 2007/0260702 A1 | 11/2007 | Richardson et al. | |
| 2008/0046596 A1 | 2/2008 | Afergan et al. | |
| 2008/0133536 A1 | 6/2008 | Bjorner et al. | |
| 2008/0228939 A1 | 9/2008 | Samuels et al. | |
| 2009/0006541 A1 | 1/2009 | Baba et al. | |
| 2009/0204885 A1 | 8/2009 | Ellsworth et al. | |
| 2009/0245122 A1 | 10/2009 | Maiocco | |
| 2009/0259736 A1 | 10/2009 | Chang et al. | |
| 2009/0328054 A1 | 12/2009 | Paramasivam et al. | |
| 2010/0030851 A1 | 2/2010 | Inden et al. | |
| 2010/0036956 A1 | 2/2010 | Nishikawa | |
| 2010/0070561 A1 | 3/2010 | Dhoolia et al. | |
| 2010/0220740 A1 | 9/2010 | Hufferd | |
| 2010/0235484 A1 | 9/2010 | Bolan et al. | |
| 2011/0106949 A1 | 5/2011 | Patel et al. | |
| 2011/0107136 A1 | 5/2011 | Jonnagadla et al. | |
| 2011/0122893 A1 | 5/2011 | Kang et al. | |
| 2011/0145786 A1 | 6/2011 | Fayed et al. | |
| 2011/0161523 A1 | 6/2011 | Erickson et al. | |
| 2011/0208808 A1 | 8/2011 | Corbett | |
| 2011/0276695 A1 | 11/2011 | Maldaner | |
| 2012/0096166 A1 | 4/2012 | Devarapalli et al. | |
| 2012/0271964 A1 | 10/2012 | Porter | |
| 2013/0054806 A1 | 2/2013 | Francis et al. | |
| 2014/0089285 A1 | 3/2014 | Gibbs | |

OTHER PUBLICATIONS

International Searching Authority, International Search Report and Written Opinion for PCT International Application No. PCT/US2012/057370, May 31, 2013, 17 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

Method and System for Displaying Graphical Objects in a Command Line Interface (CLI) Terminal, ip.com Journal, ip.com Inc., West Henrietta, NY, US, Feb. 18, 2010.

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

Brocade Communications Systems, Inc. © 2009, ServerIron ADX Server Load Balancing Guide, Chapter 4 Health Checks, Jun. 2009, 78 pages.

Oracle, Oracle Traffic Director Administrator's Guide, 11g Release 1 (11.1.1.7.0); E21036-04, Copyright © 2011, 2013, 312 pages.

* cited by examiner

US 9,069,617 B2

SYSTEM AND METHOD FOR INTELLIGENT GUI NAVIGATION AND PROPERTY SHEETS IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

FIELD OF INVENTION

The invention is generally related to a load balancer or traffic director, for use in an application server, middleware machine or other computing environment, and is particularly related to a system and method for intelligent GUI navigation and property sheets in a traffic director environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the system comprises a traffic director having one or more traffic director instances, which is configured to receive and communicate requests, from clients, to origin servers having one or more pools of servers, and an administration console user interface or GUI for use by a user/administrator in reviewing and configuring different configurable objects of the traffic director, wherein the GUI includes one or more of a "never-get-lost" navigation model, or property sheets.

DETAILED DESCRIPTION

Figure 1:
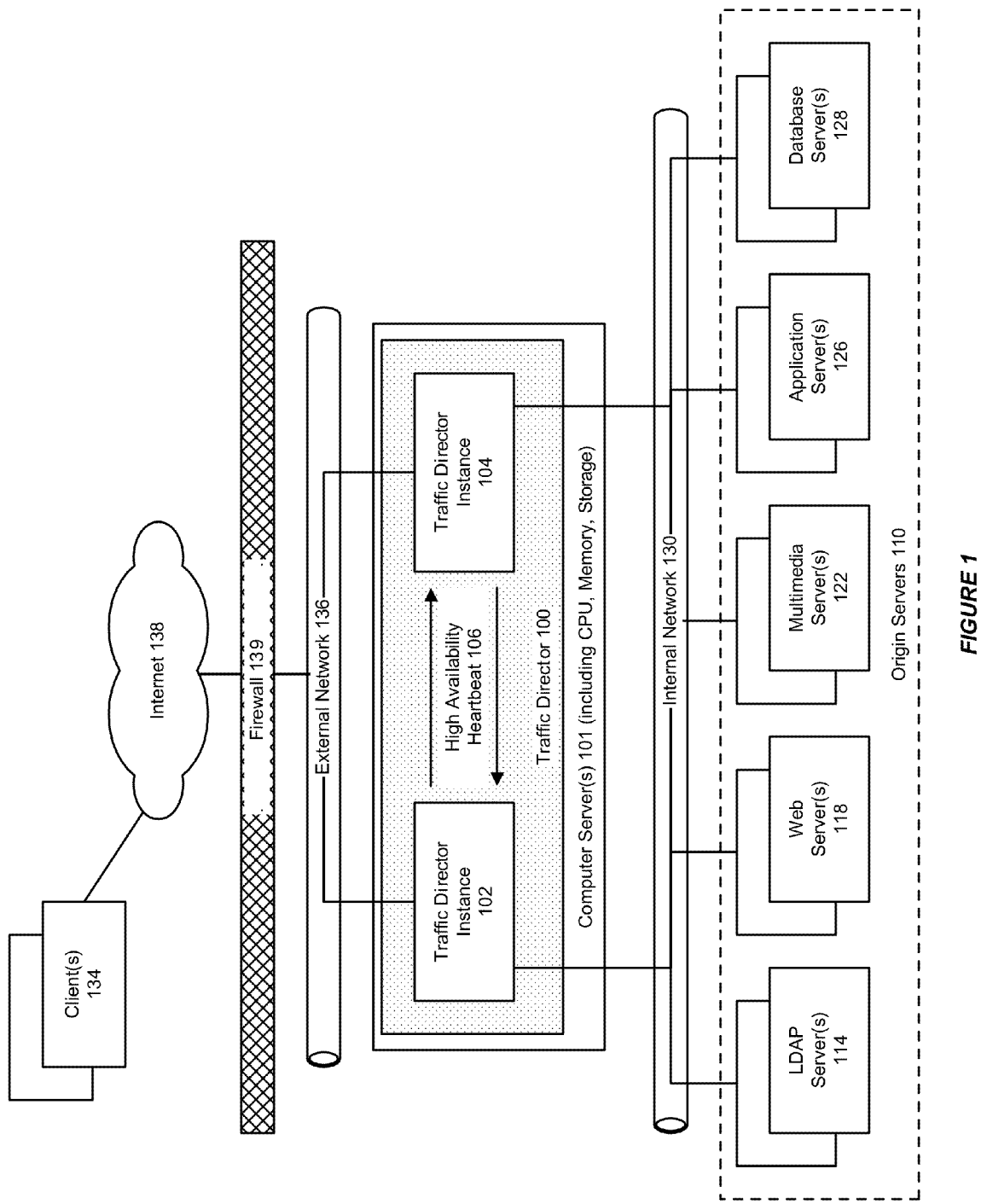
FIG. 1 illustrates a computing environment which includes a load balancer or traffic director, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
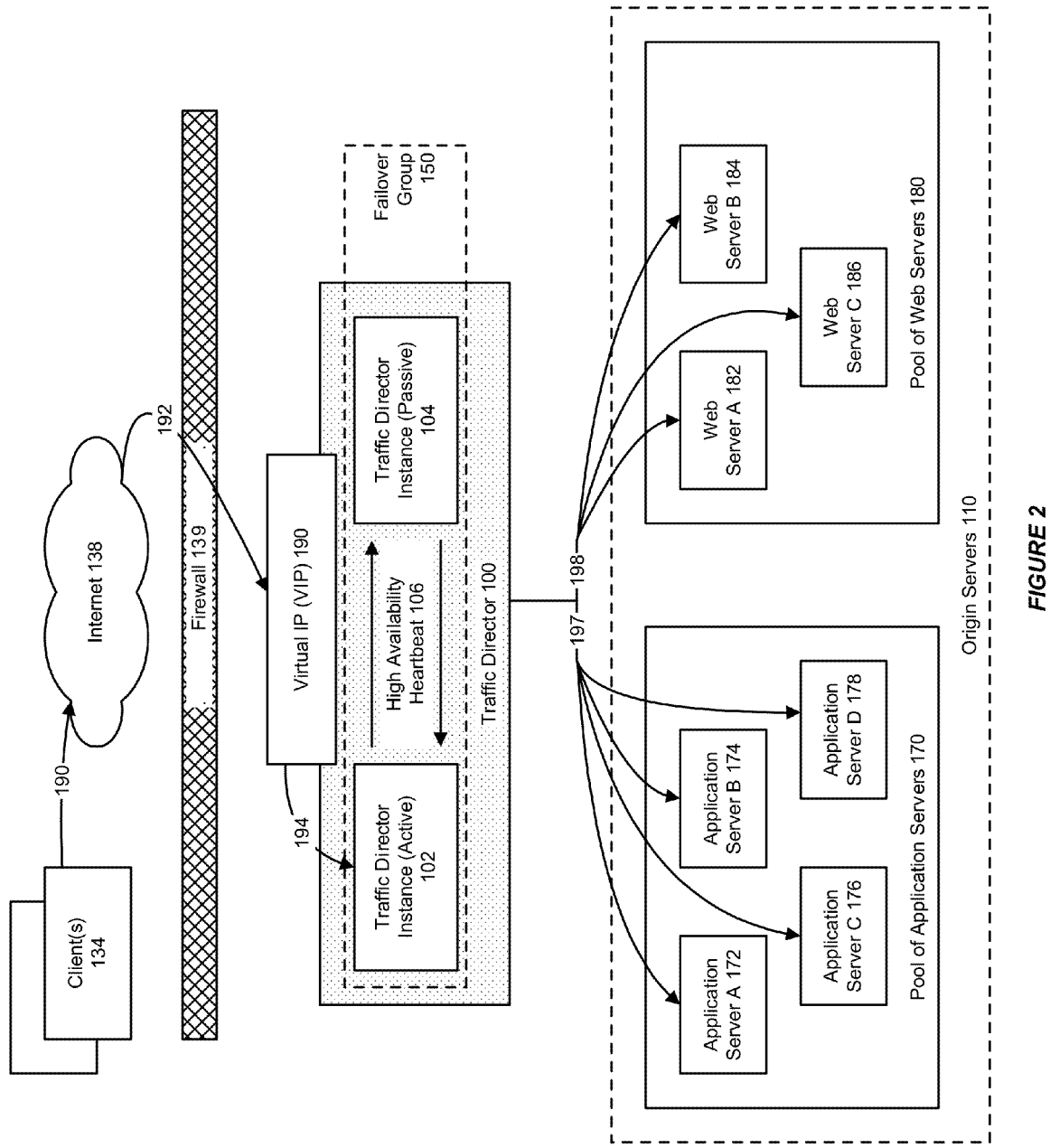
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C 186. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
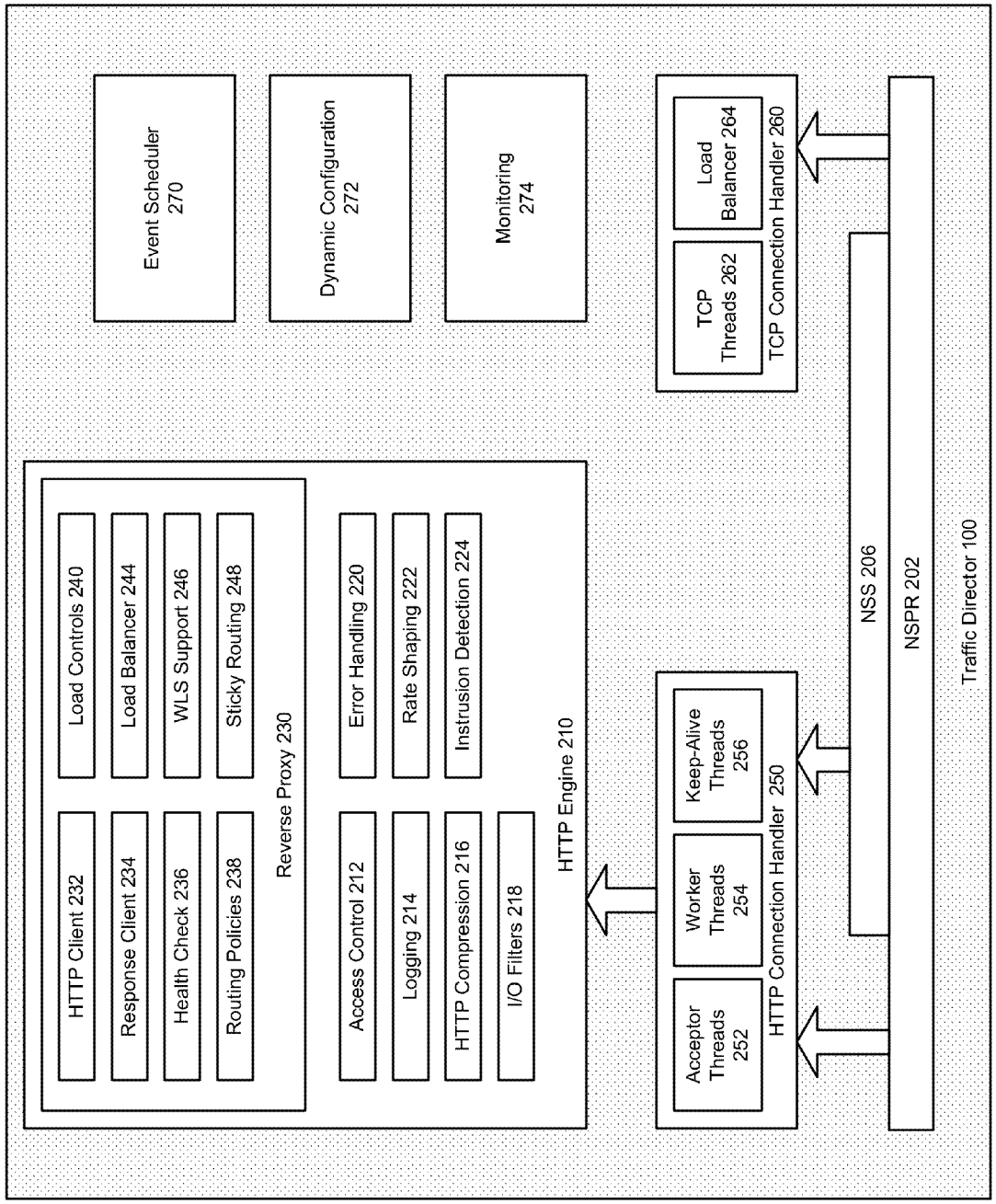
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more evens schedule 270, dynamic configuration 272, monitoring 274, or other components.

It will be evident that, in accordance with other embodiments, additional and/or different components can be used.

Figure 4:
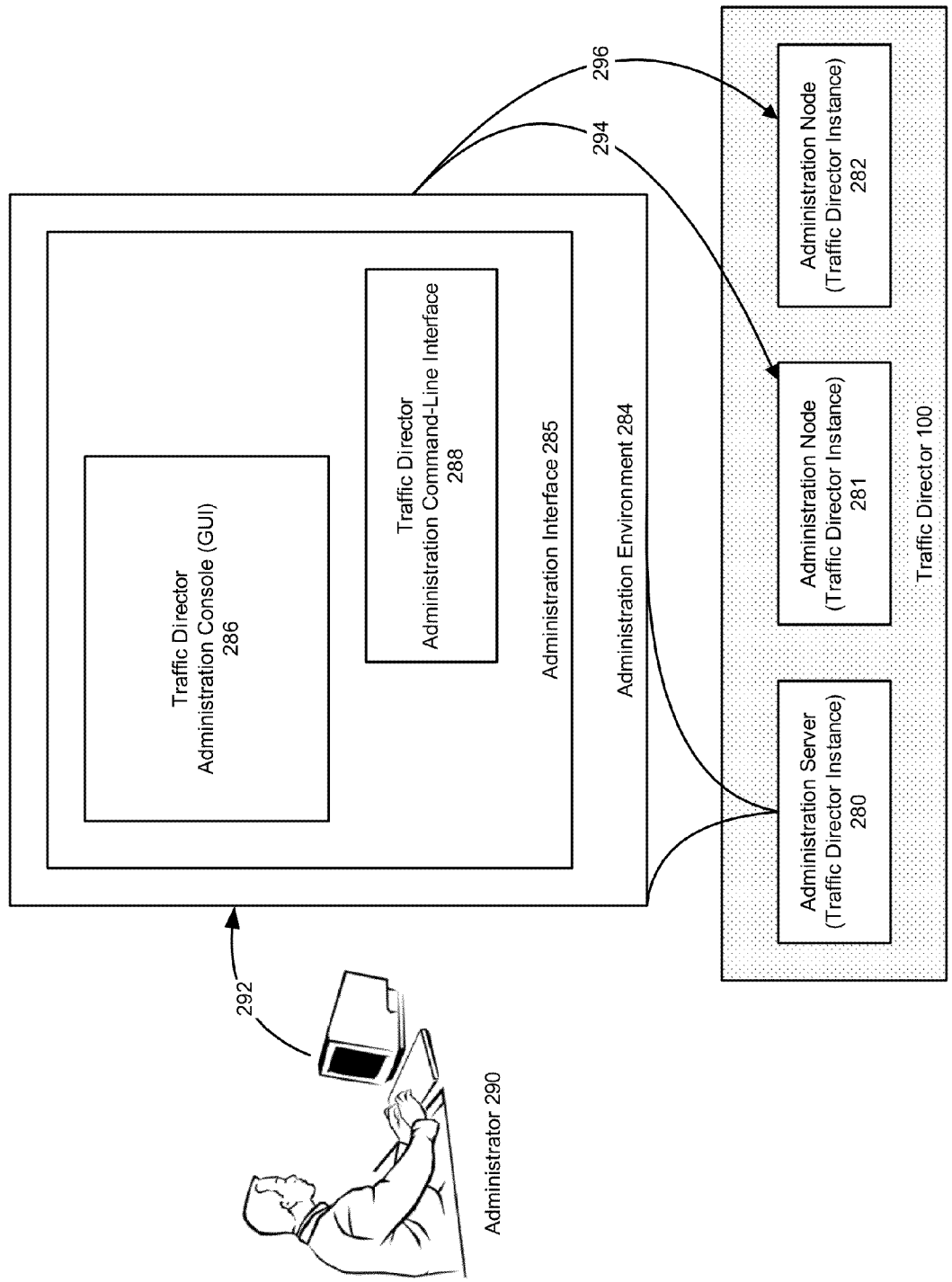
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Figure 5:
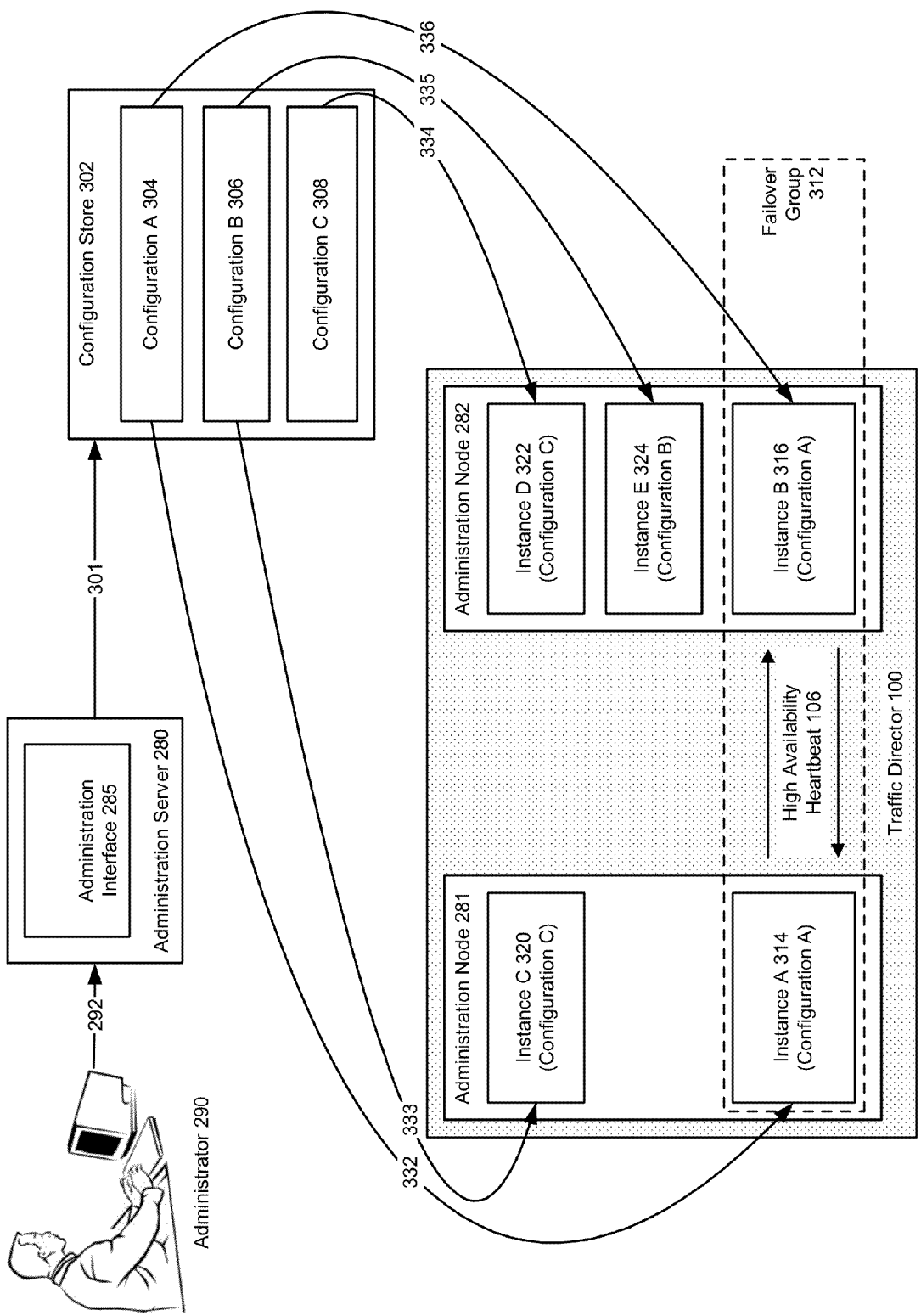
FIG. 5 illustrates the use of a traffic director administration environment to configure a traffic director, in accordance with an embodiment.

FIG. 5 illustrates the use of a traffic director administration environment to configure a traffic director, in accordance with an embodiment. In accordance with an embodiment, a configuration is a collection of configurable elements that determines the run-time behavior of a traffic director instance. A typical configuration may contain definitions for listeners on which the traffic director should listen for requests, together with information about servers at the back-end to which the requests should be sent. The traffic director can read the configuration when a traffic director instance starts, and while processing client requests.

As shown in FIG. 5, an administrator can define 301 configurations for traffic director instances, which are stored in a configuration store 302 on the administration server. The administrator can then instantiate a configuration by deploying it as instances on one or more administration nodes.

FIG. 5 illustrates an example in which the administration interface is used to create three configurations, configuration A 304, configuration B 306, and configuration C 308, which are stored in the configuration store of the administration server. Subsequently, the configuration A is deployed 332, 336 as an instance on two administration nodes 314, 316, with a failover group 312 and a high-availability heartbeat between the two nodes. The configuration B is deployed 333, 334 as an instance on two administration nodes 320, 322. The configuration C is deployed 335 as an instance on one administration node 324.

It will be evident that the example shown in FIG. 5 is provided for purposes of illustration and that, in accordance with other embodiments, different deployment scenarios can be used.

User Interface "Never-Get-Lost" Navigation

In accordance with an embodiment, the administration console user interface or GUI can include a "never-get-lost" form of navigation, which assists a user/administrator in maintaining context while reviewing and configuring different configurable objects, e.g., of a traffic director or other environment.

Figure 6:
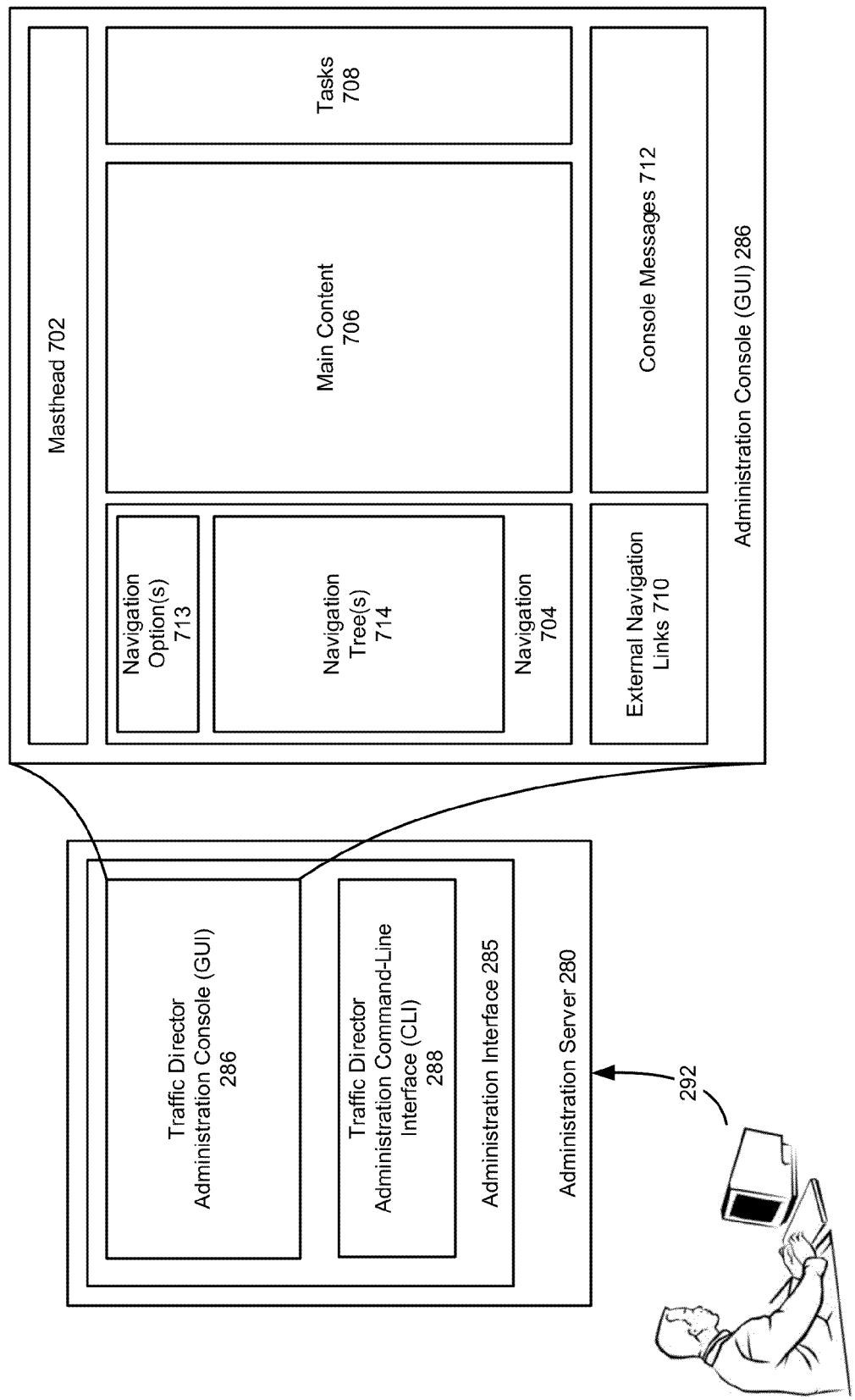
FIG. 6 illustrates a traffic director administration console, in accordance with an embodiment.

FIG. 6 illustrates a traffic director administration console, in accordance with an embodiment, which uses an example of a "never-get-lost" form of navigation. As shown in FIG. 6, the administration console GUI 286 can include a plurality of GUI sections, each of which sections can be refreshed when appropriate, to display information about different configurable objects which can be administered by a user, such as traffic director configurations or nodes.

A typical arrangement of sections can include a masthead section 702, which acts as an information section, including a product name and other information; a navigation section 704, which contains the primary navigation mechanism of the GUI, typically by displaying a tree-like menu of clickable actions; a main content section 706, which acts as the target for the clickable actions in the navigation tree and, when the user clicks a particular action, displays a page associated with that action; a tasks section 708, which displays commonly-used tasks; an external navigation links section 710; and a console messages section 712.

In accordance with an embodiment, the navigation section can be divided into one or more navigation option sections 713, and one or more navigation tree sections 714. Each of the navigation options is associated with content for display within the navigation section, typically a navigation tree of clickable actions. Selecting a particular navigation option causes its associated navigation tree to be displayed.

In accordance with other embodiments and examples, different arrangements and/or other sections can be provided in addition to, or as an alternative to, those sections described above.

Figure 7:
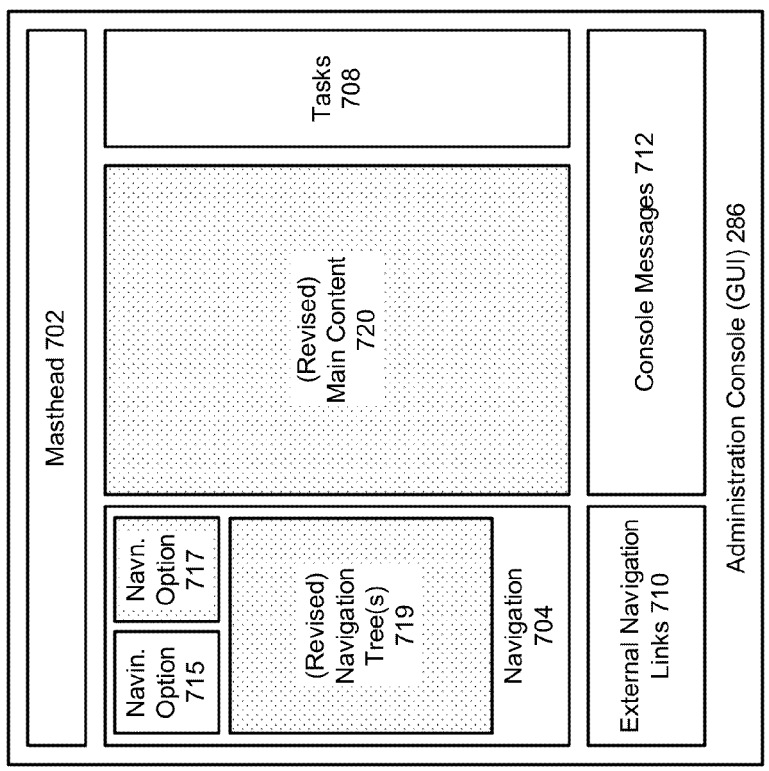
FIG. 7 illustrates a never-get-lost navigation, in accordance with an embodiment.
Figure 7:
Figure 7:
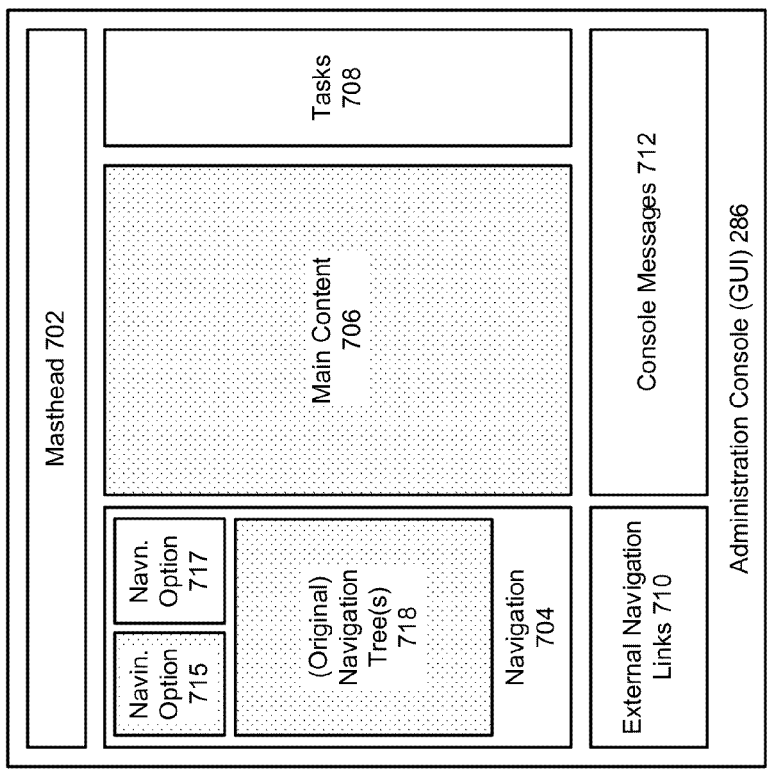

FIG. 7 illustrates a never-get-lost navigation, in accordance with an embodiment. As shown in FIG. 7, each of a plurality of navigation options 715, 717 that are displayed within the navigation section are associated with its own navigation tree.

As shown on the left-side, selecting a first navigation option (e.g., 715, shaded for illustration) causes the navigation tree associated with that navigation option 715 to be displayed 718.

Subsequently, as shown on the right-side, selecting an alternative navigation option (e.g., 717, again shaded for illustration) causes the navigation tree associated with that alternative navigation option 717 to be displayed 719.

Accordingly, the navigation section is revised to reflect the content (typically the navigation tree) that is associated with the currently selected navigation option.

In accordance with an embodiment, at the same time, other sections of the GUI can be also changed to reflect the currently selected navigation option. For example, if the main content section is intended to act as the target for clickable actions in the navigation tree, then the main content section can also be revised 720 whenever a new navigation option is selected.

Figure 8:
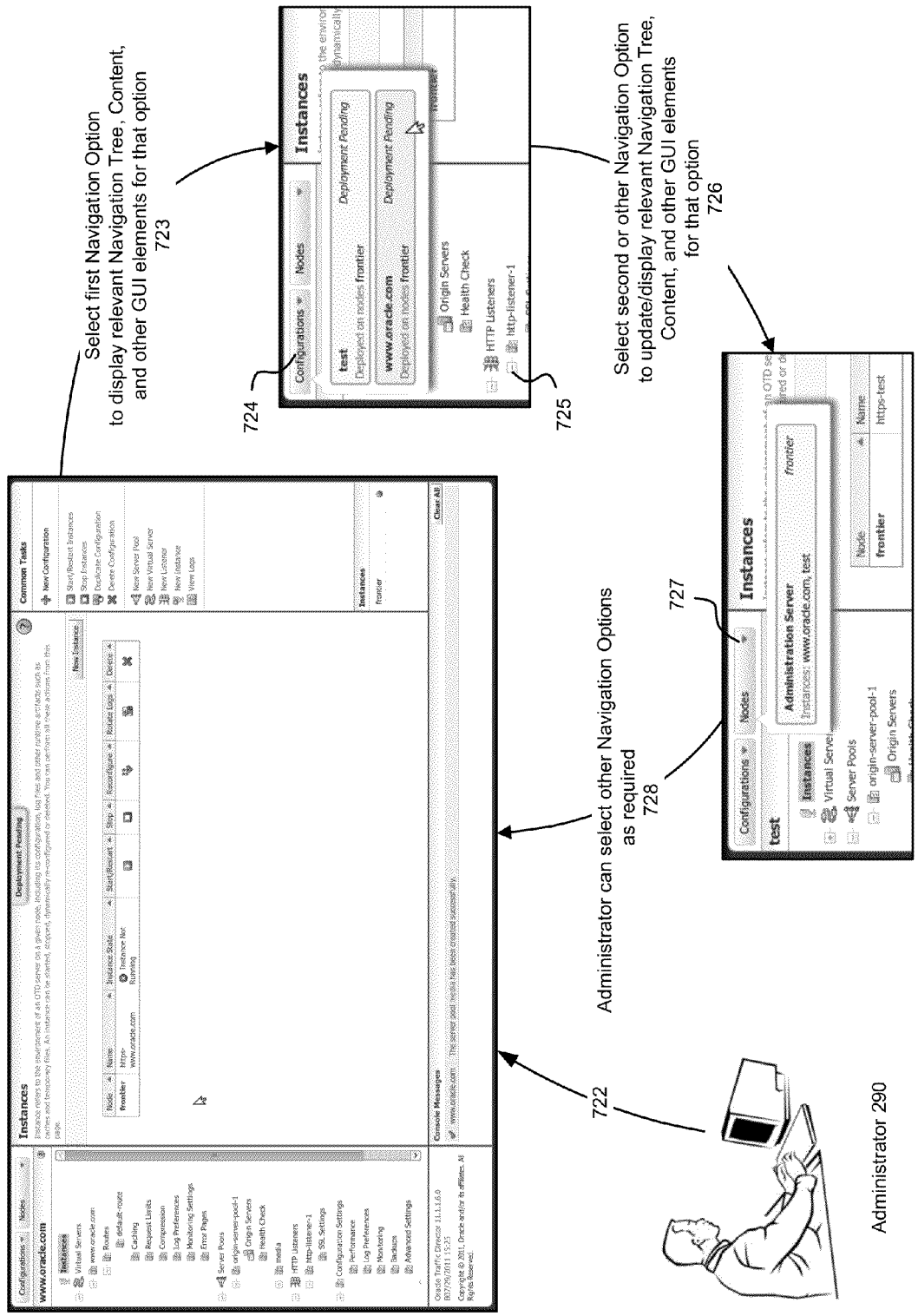
FIG. 8 illustrates use of a traffic director administration console, in accordance with an embodiment.

FIG. 8 illustrates use of a traffic director administration console, in accordance with an embodiment. In the example illustrated in FIG. 8, the GUI navigation section comprises two navigation options provided as drop-downs: "Configurations" and "Nodes". The "Configurations" option is intended to show the deployment status of any configurations on the traffic director, together with the deployed instance nodes. The "Nodes" option is intended to list nodes registered with the administration server, and well as instance configurations for each node. Clicking on either option causes the navigation tree for that option to be displayed, together with a listing of configurable objects for editing in the main content section. This allows the user to see the object being managed, and the objects available for management, on the same screen, without cluttering the space.

As shown in FIG. 8, an administrator can access 722 the administration console, and select a first navigation option 723, to display the relevant navigation tree, content, and other GUI elements associated with that first option. For example, selecting "Configurations" 724 causes the navigation section to display the "Configurations" navigation tree 725, together with a listing of relevant configurable objects for editing in the main content section.

Subsequently, the administrator can select a second or other navigation option 726, which causes the navigation tree, content, and other GUI elements associated with that second option to be displayed. For example, selecting "Nodes" 727 causes the navigation section to display the "Nodes" navigation tree 725, together with a listing of relevant configurable objects for editing in the main content section.

The administrator can continue to select other navigation options as desired 728. Since the navigation options remain displayed and available at all times, while only the navigation tree (and in some instances other sections of the GUI, such as the main section) changes, the administrator is able to maintain context while using the GUI to review and configure different configurable objects.

Figure 9:
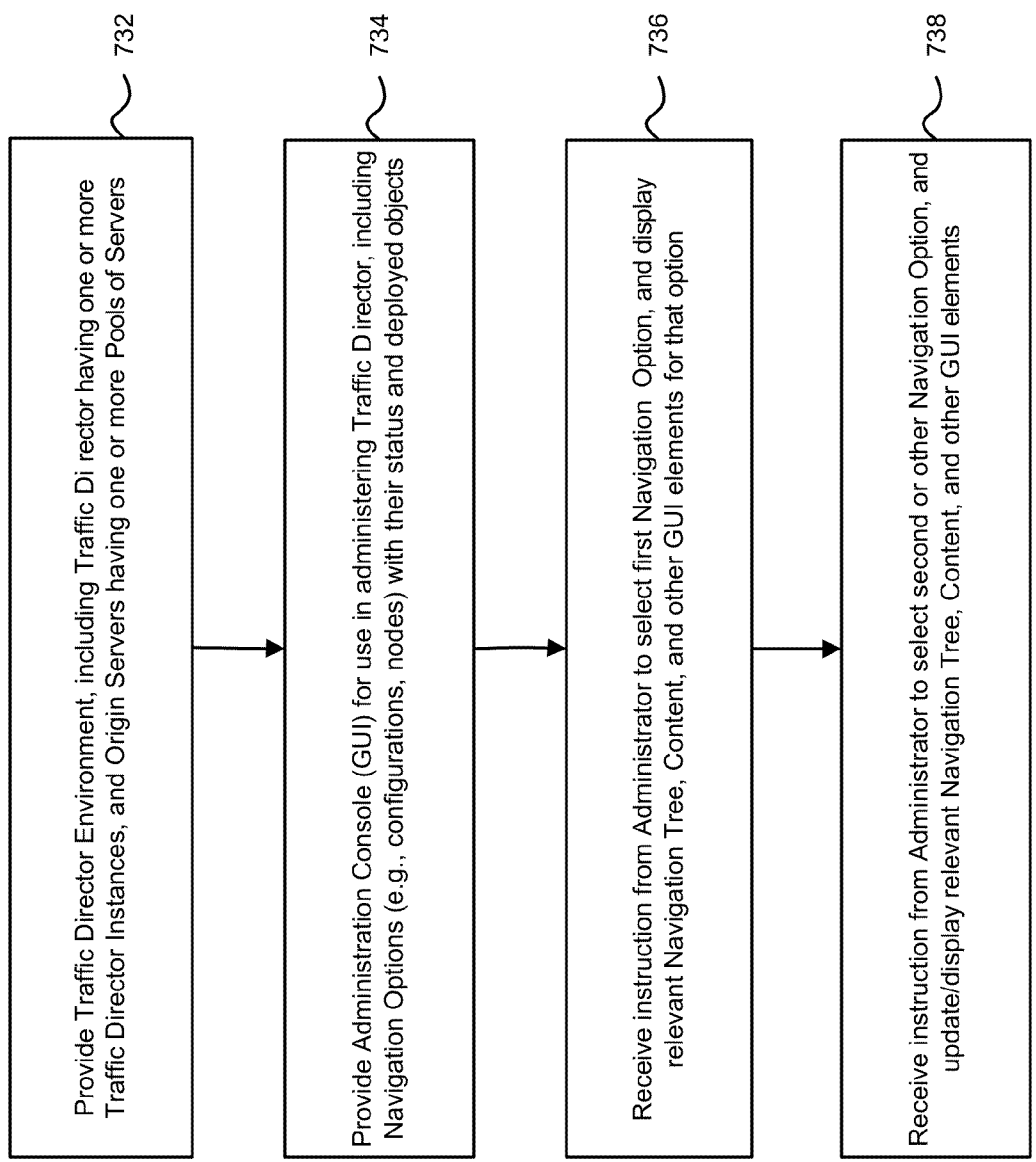
FIG. 9 is a flowchart of a method for using a traffic director administration console, in accordance with an embodiment.

FIG. 9 is a flowchart of a method for using a traffic director administration console, in accordance with an embodiment. As shown in FIG. 9, at step 732, a traffic director environment is provided, including a traffic director having one or more traffic director instances, and origin servers having one or more pools of servers. At step 734, an administration console (GUI) is provided for use in administering the traffic director, including navigation options therein (e.g. configurations, nodes) with their status and deployed objects. At step 736, an instruction is received from he administrator to select a first navigation option. In response, the system displays the relevant tree, content, and other GUI elements associated with that option. At step 738, an instruction is subsequently received from the administrator to select a second or other navigation option. In response the system updates or other displays the relevant tree, content, and other GUI elements associated with that newly selected option.

Although the embodiments described above illustrate the use of the "never-get-lost" form of navigation with a traffic director environment, in accordance with other embodiments similar functionality can be used with user interfaces for other environments, to assist users in reviewing and configuring configurable objects for those environments.

User Interface Property Sheets

In accordance with an embodiment, the administration console user interface or GUI can include property sheets for use in configuration tasks. The property sheet automatically detects modified GUI fields (as opposed to fields merely touched by a user/administrator). By tracking modified fields with a markup, the GUI can track which fields have changed, and by checking the modified value with an original value for that field, can mark or otherwise indicate changed fields.

Figure 10:
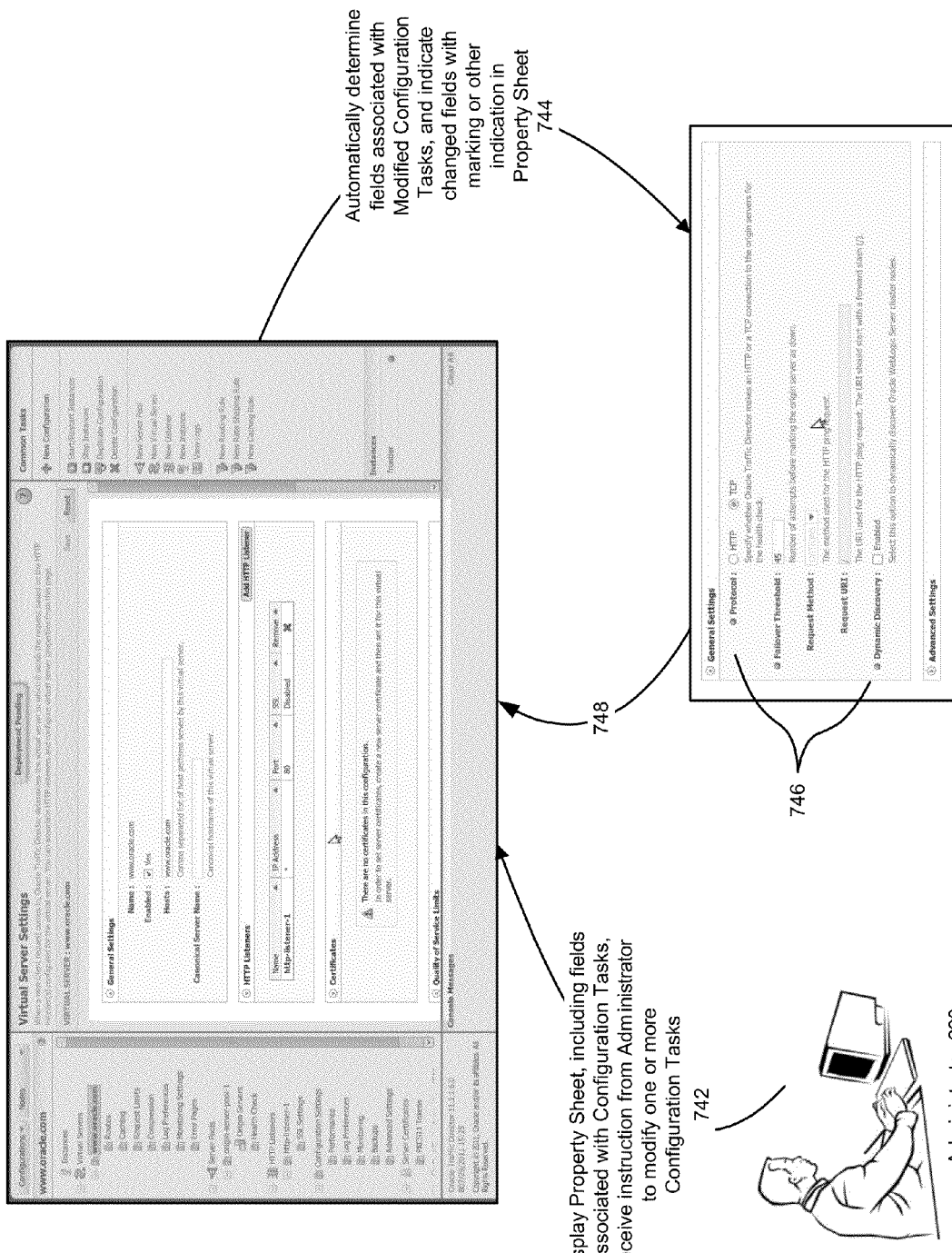
FIG. 10 illustrates a property sheet, in accordance with an embodiment.

FIG. 10 illustrates a property sheet, in accordance with an embodiment. As shown in FIG. 10, an administrator can request that the administration console display a property sheet 742, including fields associated with configuration tasks, so as to receive instructions from the administrator to modify one or more of the configuration tasks.

As the administrator interacts with the property sheet, the system automatically determines 744 fields associated with modified configuration tasks, and indicates those changed fields with a marking or other indication in the property sheet, for example by the use of a bullet-point modification indicators 746. Fields that are merely touched by the user/administrator, but not modified, are not marked. The administrator can continue to browse navigation options as desired 748.

In accordance with an embodiment, a property sheet can include sections, wherein each section is intended to be saved separately using, e.g., an AJAX call. In accordance with such embodiments, the modification indicators for a particular section can remain unchanged if the save process for that particular section causes an error on saving.

Figure 11:
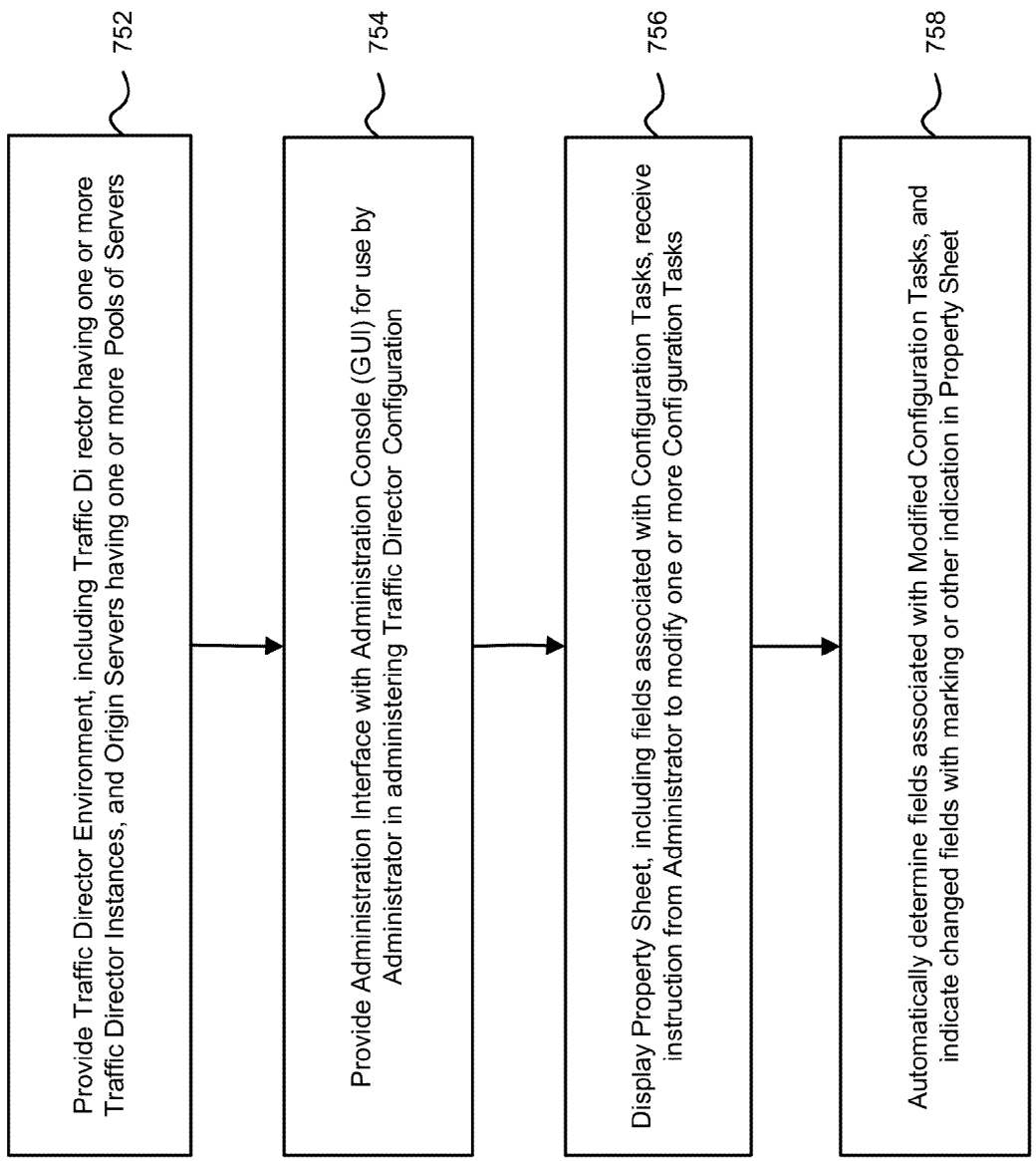
FIG. 11 is a flowchart of a method for using a property sheet, in accordance with an embodiment.

FIG. 11 is a flowchart of a method for using a property sheet, in accordance with an embodiment. As shown in FIG. 11, at step 752, a traffic director environment is again provided, including a traffic director having one or more traffic director instances, and origin servers having one or more pools of servers. At step 754, an administration console is provided with a GUI for use by the administrator in configuring the traffic director configuration. At step 756, a property sheet is displayed, including fields associated with configuration tasks, which the administrator can modify as desired to modify the configuration task. At step 758, the system automatically determines which fields are associated with modified configuration tasks, and indicates those changed fields, such as marking or otherwise indicating the fields in the property sheet.

Again, although the embodiments described above illustrate the use of property sheets with a traffic director environment, in accordance with other embodiments similar functionality can be used with user interfaces for other environments, to assist users in reviewing and configuring configurable objects for those environments.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A traffic director system which receives and communicates requests from clients to a plurality of pools of origin servers each comprising a plurality of origin servers, the traffic director comprising:
    a microprocessor and a computer memory;
    a traffic director having a plurality of traffic director instances, the traffic director including
        an HTTP connection handler which receives HTTP requests from said clients,
        an HTTP engine operating on said microprocessor and computer memory, wherein
    said HTTP engine receives said HTTP requests from said HTTP connection handler, and
        a reverse proxy module in said HTTP engine, wherein the reverse proxy module selects a pool of said plurality of pools of origin servers to which said requests should be directed and forwards said requests to one or more of the plurality of origin servers in said pool; and
    an administration console user graphic interface (GUI) for use by a user/administrator in managing said plurality of traffic director instances by reviewing and configuring different configurable objects of the traffic director;
    wherein the GUI includes a plurality of sections including a navigation section divided into one or more navigation options and a navigation tree section; and
    wherein each of the navigation options is associated with content for display within the navigation tree section, and wherein selecting a particular navigation option in the GUI causes its associated content to be displayed.

2. The system of claim 1, wherein each of the navigation options is associated with a navigation tree for display within the navigation tree section, and wherein the GUI further includes a main content section which acts as a target for clickable actions in the navigation tree currently displayed.

3. The system of claim 2, wherein the system enables a user to select a first navigation option which causes the navigation tree associated with the first navigation option to be displayed, and subsequently select an alternative navigation option which causes the navigation tree associated with that alternative navigation option to be displayed in the navigation tree section.

4. The system of claim 3, wherein upon displaying a particular navigation tree in the navigation tree section, the main content section is revised to display a listing of configurable objects associated with that navigation tree.

5. The system of claim 1, wherein:
the GUI further comprises a property sheet which automatically detects modified GUI fields, such that the GUI can track which fields have changed, and by checking the modified value with an original value for that field, marks or otherwise indicates changed fields.

6. The system of claim 5, wherein said property sheet includes sections, wherein each section is intended to be saved separately, and wherein modification indicators for a particular section remain unchanged if the save process for that particular section causes an error on saving.

7. The system of claim 1, wherein said GUI enables an administrator to configure a configuration of each of said plurality of traffic director instances by configuring a collection of configurable elements which determines the run-time behavior of each traffic director instance including definitions for listeners on which the traffic director should listen for requests, together with information about origin servers to which requests should be sent.

8. The system of claim 1, wherein said GUI implements a never-get-lost navigation feature which assists a user/administrator in maintaining context while reviewing and configuring different configurable objects.

9. A method for receiving and communicating requests from clients to a plurality of pools of origin servers each comprising a plurality of origin servers, the method comprising:
providing a traffic director which is configured to receive and communicate requests, from the clients, to the plurality of pools of origin servers each comprising a plurality of origin servers, wherein the traffic director comprises
a plurality of traffic director instances,
an HTTP connection handler which receives HTTP requests from said clients,
an HTTP engine operating on one or more microprocessor and computer memory, wherein said HTTP engine receives said HTTP requests from said HTTP connection handler, and
a reverse proxy module in said HTTP engine, wherein the reverse proxy module selects a pool of said plurality of pools of origin servers to which said requests should be directed and forwards said requests to one or more of the plurality of origin servers in said pool;
providing an administration console graphic user interface (GUI) for use by a user/administrator in managing said plurality of traffic director instances by reviewing and configuring different configurable objects of the traffic director; and
wherein the GUI includes a plurality of sections including a navigation section divided into one or more navigation options and a navigation tree section, wherein each of the navigation options is associated with content for display within the navigation tree section, and wherein selecting a particular navigation option causes its associated content to be displayed.

10. The method of claim 9, wherein each of the navigation options is associated with a navigation tree for display within the navigation tree section, and wherein the GUI further includes a main content section which acts as a target for clickable actions in the navigation tree currently displayed.

11. The method of claim 10, wherein the system enables a user to select a first navigation option which causes the navigation tree associated with the first navigation option to be displayed, and subsequently select an alternative navigation option which causes the navigation tree associated with that alternative navigation option to be displayed in the navigation tree section.

12. The method of claim 11, wherein upon displaying a particular navigation tree in the navigation tree section, the main content section is revised to display a listing of configurable objects associated with that navigation tree.

13. The method of claim 9, further comprising:
providing a property sheet which automatically detects modified GUI fields, such that the GUI is configured to notify the administrator which fields have changed by marking changed fields in the property sheet.

14. The method of claim 13, wherein the property sheet includes sections, wherein each section is intended to be saved separately.

15. A non-transitory computer readable medium, including instructions stored thereon for supporting receiving and communicating requests from clients to a plurality of pools of origin servers each comprising a plurality of origin servers, which instructions, when read and executed by one or more computers cause the one or more computers to perform steps comprising:
providing a traffic director which is configured to receive and communicate requests, from the clients, to the plurality of pools of origin servers each comprising a plurality of origin servers, wherein the traffic director comprises
a plurality of traffic director instances,
an HTTP connection handler which receives HTTP requests from said clients,
an HTTP engine operating on one or more microprocessor and computer memory, wherein said HTTP engine receives said HTTP requests from said HTTP connection handler, and
a reverse proxy module in said HTTP engine, wherein the reverse proxy module selects a pool of said plurality of pools of origin servers to which said requests should be directed and forwards said requests to one or more of the plurality of origin servers in said pool;
providing an administration console graphic user interface (GUI) for use by a user/administrator in managing said plurality of traffic director instances by reviewing and configuring different configurable objects of the traffic director;
wherein the GUI includes a plurality of sections including a navigation section divided into one or more navigation options and a navigation tree section, wherein each of the navigation options is associated with content for display within the navigation tree section, and wherein selecting a particular navigation option causes its associated content to be displayed.

16. The non-transitory computer readable medium of claim 15, including further instructions stored thereon for supporting receiving and communicating requests from clients to a plurality of pools of origin servers each comprising a plurality of origin servers, which further instructions, when read and executed by the one or more computers cause the one or more computers to perform further steps comprising:

providing a property sheet in the GUI wherein the property sheet automatically detects modified GUI fields, such that the GUI can track changed fields by comparing a value of the modified GUI field with an original value for that GUI field, and provided modification indicators on the property sheet for changed fields.

17. A traffic director system which receives and communicates requests from clients to a plurality of pools of origin servers each comprising a plurality of origin servers, the traffic director comprising:

a microprocessor and a computer memory;

a traffic director having a plurality of traffic director instances;

an HTTP connection handler which receives HTTP requests from said clients;

an HTTP engine operating on said microprocessor and computer memory, wherein said HTTP engine receives said HTTP requests from said HTTP connection handler;

a reverse proxy module in said HTTP engine, wherein the reverse proxy module selects a pool of said plurality of pools of origin servers to which said requests should be directed and forwards said requests to one or more of the plurality of origin servers in said pool;

an administration console graphic user interface (GUI) for use by a user/administrator in managing said plurality of traffic director instances by reviewing and configuring different configurable objects of the traffic director; and a property sheet which automatically detects modified GUI fields, such that the GUI can track which fields have changed, and by checking the modified value with an original value for that field, marks or otherwise indicates changed fields.

18. The system of claim 17, wherein the property sheet includes sections, wherein each section is intended to be saved separately, and wherein modification indicators for a particular section remain unchanged if the save process for that particular section causes an error on saving.

19. A method for receiving and communicating requests from clients to a plurality of pools of origin servers each comprising a plurality of origin servers, the method comprising:

providing a traffic director which is configured to receive and communicate requests, from the clients, to the plurality of pools of origin servers each comprising a plurality of origin servers, wherein the traffic director comprises a plurality of traffic director instances, an HTTP connection handler which receives HTTP requests from said clients, an HTTP engine operating on one or more microprocessor and computer memory, wherein said HTTP engine receives said HTTP requests from said HTTP connection handler, and a reverse proxy module in said HTTP engine, wherein the reverse proxy module selects a pool of said plurality of pools of origin servers to which said requests should be directed and forwards said requests to one or more of the plurality of origin servers in said pool;

providing an administration console graphic user interface (GUI) for use by a user/administrator in managing said plurality of traffic director instances by reviewing and configuring different configurable objects of the traffic director; and providing a property sheet which automatically detects modified GUI fields, such that the GUI can track which fields have changed, and by checking the modified value with an original value for that field, and provided modification indicators on the property sheet for changed fields.

20. The method of claim 19, wherein the property sheet includes sections, wherein each section is intended to be saved separately, and wherein said modification indicators remain unchanged for a particular section if a save process for that particular section causes an error on saving.

* * * * *

UNITED STATES PATENT AND TRADEMARK OFFICE
CERTIFICATE OF CORRECTION

PATENT NO. : 9,069,617 B2  
APPLICATION NO. : 13/601663  
DATED : June 30, 2015  
INVENTOR(S) : Ahmed Page 1 of 1

It is certified that error appears in the above-identified patent and that said Letters Patent is hereby corrected as shown below:

On Title page 2, in column 2, under other publications, line 17, delete "Serverlron" and insert -- Serveriron --, therefor.

In Drawings,

On sheet 9 of 11, in FIG. 9, under reference numeral 732, line 1, delete "Di rector" and insert -- Director --, therefor.

On sheet 9 of 11, in FIG. 9, under reference numeral 734, line 1, delete "Di rector" and insert -- Director --, therefor.

On sheet 10 of 11, in FIG. 10, under reference numeral 742, line 3, delete "Adm inistrator" and insert -- Administrator --, therefor.

On sheet 11 of 11, in FIG. 11, under reference numeral 752, line 1, delete "Di rector" and insert -- Director --, therefor.

In Specification,

In column 1, line 26, after "all" delete "copyrights" and insert -- copyright --, therefor.

In column 8, line 67, after "from" delete "he" and insert -- the --, therefor.

Signed and Sealed this  
Sixteenth Day of August, 2016

Michelle K. Lee  
*Director of the United States Patent and Trademark Office*